Figure 1:
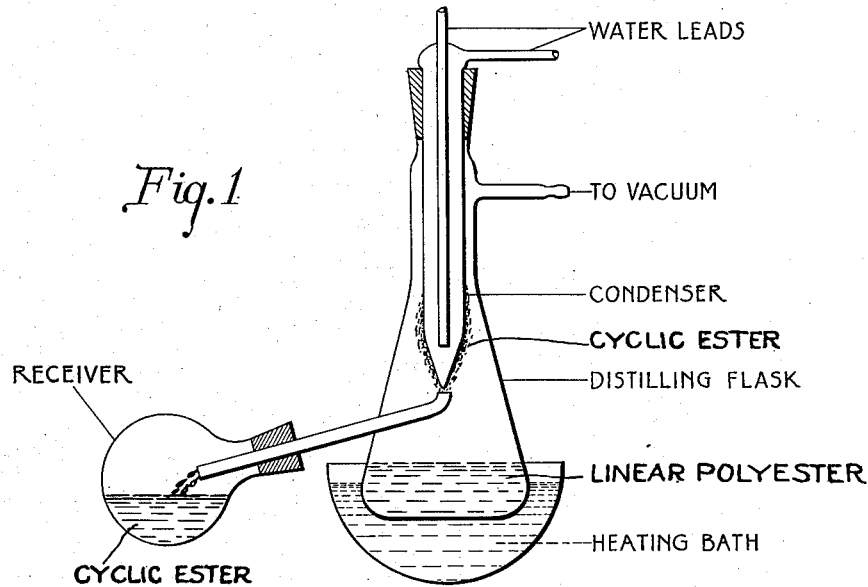

Patented Nov. 12, 1935                                          2,020,298

UNITED STATES PATENT OFFICE

2,020,298
CYCLIC ESTER

Wallace Hume Carothers, Fairville, Pa., and
Julian Werner Hill, Wilmington, Del., assignors
to E. I. du Pont de Nemours & Company, Wilmington, Del., a corporation of Delaware Application February 18, 1933, Serial No. 657,408

28 Claims. (Cl. 260—98)

This invention relates to cyclic esters having rings of more than seven atoms and processes for making same, and especially to monomeric and dimeric esters of this type derived from dibasic acids and glycols.

It is well known that cyclic esters having rings of five or six atoms are easily obtained by the self-esterification of appropriate open chain compounds (e. g., hydroxybutyric acid, $$HOCH_2CH_2CH_2COOH$$

gives butyrolactone

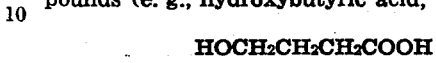

and monomeric ethylene carbonate,

is readily obtained by the action of diethyl carbonate or of phosgene on ethylene glycol); and it might be supposed that cyclic esters having rings of more than seven atoms would be obtained from appropriate open chain compounds in the same way. But in fact, they cannot be obtained in this way. Extensive study (J. Am. Chem. Soc. 51, 625, 2560, 3450 (1929); 52, 314, 711, 3292 (1930); Helv. Chim. Acta 12, 463 (1929)) has shown the reason for this to be that the ester formation proceeds intermolecularly and yields polyesters of high molecular weight.

Thus, hydroxydecanoic acid, $HO(CH_2)_9COOH$, undergoes self-esterification when it is heated; the product, however, is a polyester of the general formula $$HO(CH_2)_9CO—O(CH_2)_9CO—O$$
$$(CH_2)_9CO—. \quad .—O(CH_2)_9CO—OH,$$

and no discoverable amount of the corresponding cyclic lactone,

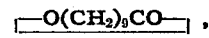

is formed. Similarly, esters derived from dibasic acids and glycols are polymeric unless the nature of the reacting materials is such as to permit the formation of a ring of five or six atoms, For example, ethylene succinate is obtained in the form of a polyester, . . .—$O(CH_2)_2OCO(CH_2)_2CO$—$O(CH_2)_2OCO$
$(CH_2)_2CO$—$O(CH_2)_2OCO(CH_2)_2CO$—. . .

and not as a monomeric cyclic ester,

Again, hexamethylene carbonate is obtained as

. . .—$COO(CH_2)_6O$—$COO(CH_2)_6O$—
$COO(CH_2)_6O$—$COO(CH_2)_6O$. . - and not as

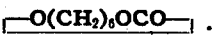

For the purpose of further discussing some of the above compounds it is convenient to introduce and define certain terms. The polymeric esters prepared or derived from hydroxy acids or from dibasic acids and glycols are called linear polyesters. The molecules are long chains having a structure that may be symbolized by the general formula,

. . .—ORCO—ORCO—ORCO—
ORCO—ORCO—ORCO—. . .

(R is not necessarily a hydrocarbon residue. The length of the molecules and the nature of the terminal groups depends upon the nature of the reactants and the condition of the reaction.) The recurring unit (—ORCO—) in this structure is called the structural unit, and the number of atoms in the chain of this unit is called the unit length. Examples of structural units are:

| Name of ester | Formula of structural unit | Unit length |
|---|---|---|
| Ethylene succinate | —$O(CH_2)_2OCO(CH_2)_2CO$— | 8 |
| Ethylene carbonate | —$O(CH_2)_2OCO$— | 5 |
| Decamethylene carbonate | —$O(CH_2)_{10}OCO$— | 13 |
| Self-ester from ω-hydroxydecanoic acid | —$O(CH_2)_9CO$— | 11 |

The unit length is obviously defined by the nature of the compounds from which the ester is derived. It is same as the number of atoms that would be present in the ring of the monomeric cyclic ester if such an ester could be obtained.

In general, this unit length determines the nature of the ester that will be produced. If the unit length is five or six, a cyclic monomeric ester is readily obtained; if the unit length is more than seven, the product is a linear polyester. These generalizations apply to esters derived from hydroxy acids or from dibasic acids plus dihydric alcohols, whether the esters are prepared from these reactants as such or from appropriate derivatives of these reactants.

Linear polyesters are either solids or highly viscous liquids. They are non-volatile and stable and they generally show little or no tendency to break down under the influence of heat until a very high temperature is reached (e. g., 300° to 500° C.) and the reaction that then occurs is not simple depolymerization but destructive thermal decomposition: carbonaceous, tarry, gaseous, and liquid products are formed. From the latter it is sometimes possible to isolate very small amounts of cyclic esters (true depolymerization products of the polyester used): dimeric cyclic esters have thus been obtained from ethylene succinate, tetramethylene carbonate, and trimethylene oxalate; but the process is not general; the yields are very poor; and no monomeric cyclic esters having more than seven atoms in the ring have ever been obtained by this method.

An object of this invention is the preparation of monomeric and dimeric cyclic esters having more than seven atoms in the ring, and particularly the preparation of esters of this type derived from dibasic acids and dihydric alcohols.

Figure 2:
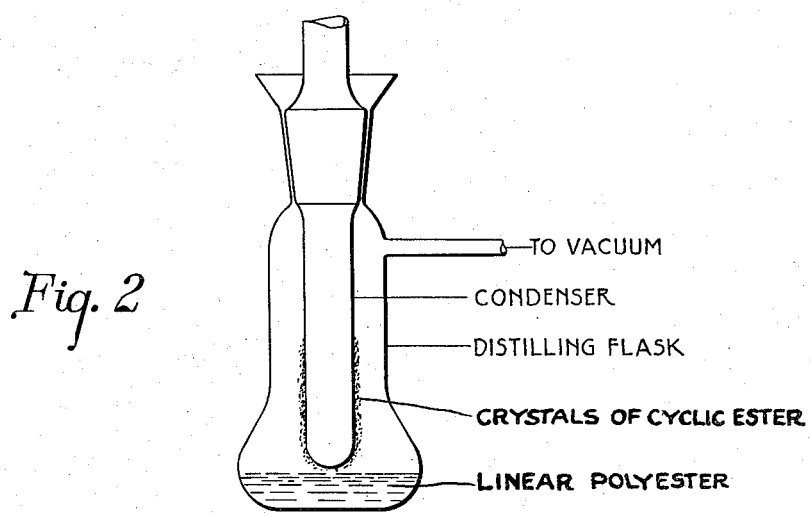

In the drawing which is diagrammatic, Figures 1 and 2 illustrate types of apparatus which may be used in practicing the invention.

As stated above, attempts to depolymerize linear polyesters whose structural units are longer than seven atoms by ordinary and obvious methods are generally unsuccessful. No appreciable depolymerization occurs until the temperature is raised so high that destructive thermal decomposition sets in, and the product then consists of a very complicated mixture of gaseous, liquid, unsaturated, and tarry products. The present invention consists in the discovery that it is possible nevertheless by heating such linear polyesters under certain specified conditions to obtain a smooth depolymerization resulting in a substantially complete conversion of the polyester into the corresponding cyclic monomeric esters and dimeric esters. These cyclic esters are stable compounds and many of them are useful on account of their odorous properties.

The conditions referred to are as follows:

(1) The temperature of heating is kept below the temperature of thermal decomposition. By thermal decomposition (as distinguished from depolymerization) we mean a general disintegration or destruction made manifest by the appearance of a dark brown or black color (carbonization) and/or the formation of unsaturated and gaseous products. The temperature of thermal decomposition depends somewhat upon the nature of the ester, the nature of the material of the vessel, the nature of impurities that may be present, etc., but in general it lies below 375° C. and above 275° C. Consequently, in carrying out the depolymerization, the maximum temperature used is not far above 300° C. The minimum temperature that can be successfully used depends somewhat on the nature of the polyesters, etc., but in general it is above 150° C. The temperatures referred to are the temperatures of the heating bath in which the reaction vessel is immersed.

(2) The heating is carried out in vacuo. In general, the best results are obtained with the highest possible vacua but very high vacua are by no means necessary. Quite satisfactory results are obtained at pressure of from 1 to 5 mm. of mercury, and successful results at pressures as high a 20 to 30 mm.

(3) The depolymerization is catalyzed by the addition of bases such as the alkali and alkaline earth metals, hydroxides, oxides, carbonates, and alcoholates or by finely divided metals such as metallic tin. The use of such catalysts is very advantageous since the speed of depolymerization is enormously increased. The catalysts may be added in any convenient form or manner, e. g., to the glycol and acid from which the polyester is derived, or to the polyester itself. They probably undergo reaction to form conversion products of some kind, but these, whatever they may be, function as catalysts.

(4) The depolymerization is carried out in such a manner as to permit the reaction products to distill continuously from the reaction mixture and to be collected, after being condensed, in a suitable receiver. The dimensions and shape of the apparatus used may be varied quite widely but the rate of polymerization is increased by increasing the superficial area of the polyester mass. Hence, other things being equal, it is preferable to have the polyester spread out in a fairly thin layer so as to present a fairly large surface from which distillation can occur. With this factor in mind it is possible to carry out the depolymerization of certain polyesters— particularly those derived from carbonic and oxalic acids—in conventional distillation equipment.

Thus as shown in Example 3 decamethylene carbonate can be smoothly depolymerized merely by heating it with a catalyst under diminished pressure in an ordinary spherical glass distilling flask connected with a suitable condenser and receiver. Certain polyesters, however, e. g., those derived from succinnic and sebacic acids, depolymerize very much more slowly than carbonates. In these cases it is desirable to arrange the apparatus so as to favor especially the instantaneous and permanent escape of the product molecules. This can be accomplished by placing a condenser directly above the distilling surface, and as close to it as possible. The evaporating molecules especially at high vacua then move directly in a straight line from the evaporating surface to the condenser and only a very small fraction of the evaporating molecules are deflected back to the evaporating surface where they would be likely to polymerize before they could again escape. Diagrammatic plans of types of apparatus that fulfill these requirements are shown in Figures 1 and 2. By means of such apparatus depolymerizations that would otherwise be so slow as to yield no appreciable amount of product can in many cases be speeded up to a practical rate.

The process thus consists in heating a linear polyester to a temperature above 150° C. but below the temperature of destructive thermal decomposition in the presence of a basic or metallic catalyst under diminished pressure in an apparatus designed to permit the volatile products to distill and be collected continuously as they are formed.

Example 1—Decamethylene carbonate

A sample of polymeric decamethylene carbonate was prepared from decamethylene glycol and butyl carbonate as follows. (See Carothers and VanNatta, J. Am. Chem. Soc. 52, 314 (1930) and Carothers application Ser. No. 406,721, filed November 12, 1929). Forty grams of decamethylene glycol and 42 g. of n-butyl carbonate were placed in a distilling flask and heated in a metal bath. Two tenths of a gram of sodium was added to the molten mixture where it soon dissolved. Heating was continued for three hours, the temperature being raised gradually from 180°–230° C. during this time. About 85 per cent of the theoretical quantity of n-butyl alcohol distilled. The mixture was then heated further three hours at 210°–220° C. under a vacuum of less than 2 mm. The product remaining in the distilling flask was highly viscous liquid that solidified on cooling to a hard, tough wax.

Twenty-one grams of this polymeric decamethylene carbonate was transferred to a vessel of the type shown in Figure 2 and heated by a bath at 240° C. during 80 hours. The pasty distillate which collected on the condenser was removed from time to time and separated into two fractions by filtration with suction. Nine grams of solid and 5 g. of liquid were obtained. The liquid fraction was distilled through a short column; it boiled at 88°–93° C. at 1 mm. pressure with the bath at 113°–120° C. A crystalline residue, amounting to 2.5 g. was combined with the solid portion from the filtration. This was purified by crystallization from alcohol to constant melting point; the cyclic dimeric decamethylene carbonate was thus obtained in the form of handsome plates melting at 105°–106° C. The liquid product boiling at 88°–93° C. at 1 mm. was monomeric decamethylene carbonate. It has an exceedingly powerful odor recalling otto of roses.

A similar experiment using polymeric decamethylene carbonate which had been freed of sodium by solution in benzene and washing with water, resulted in an extremely slow depolymerization.

Example 2—Decamethylene carbonate

A series of depolymerizations carried out in a still of the type of Figure 1 yielded a total of 172 grams of liquid monomer (containing roughly 15% of dimer in solution) and 65 grams of crystalline dimer.

Example 3—Decamethylene carbonate

Twenty-five grams of polymeric decamethylene carbonate prepared as in Example 1 was placed in an ordinary 125 cc. distilling flask fitted with another distilling flask as a receiver in the manner usually employed in carrying out vacuum distillations. The flask was immersed in a molten metal bath to within ¾ inch of the side arm and heated for 5 hours at 250° C. under 0.5 mm. pressure. Twenty-two grams of distillate was obtained from which 1.2 grams of crystalline dimer was filtered.

A similar run of 100 grams of polymer in a 250 cc. distilling flask yielded 52 grams of liquid monomer (saturated with dimer) and 4 grams of crystalline dimer in 22 hours. It will be observed that in these experiments the ratio of monomer to dimer is much higher than in Examples 1 and 2.

Example 4—Octamethylene carbonate

Ten grams of octamethylene glycol, 0.06 g. of sodium, and 13.5 g. of dibutyl carbonate were heated together at first under ordinary pressure and then under diminished pressure until the distillation of butyl alcohol was substantially complete. The residue of polymeric octamethylene carbonate, which at ordinary temperature was a rather hard, opaque solid, was transferred to a distilling flask fitted with a receiver, as described in Example 3. The material was heated for three days at 235°–245° C. at a pressure of about 0.5 mm. The distillate was separated by filtration into a liquid portion (8.5 g.) and a crystalline portion (0.3 g.). The latter after recrystallization from alcohol melted at 115°–116° C. It was identified as dimeric cyclic octamethylene carbonate. The liquid portion on redistillation boiled at 74°–76° C. at 0.5 mm. It was identified as monomeric cyclic octamethylene carbonate. It has a very strong pleasant earthy and faintly camphoraceous odor.

When the depolymerization of polymeric octamethylene carbonate is carried out in an apparatus of the type shown in Figure 2, the product is almost exclusively the crystalline cyclic dimer.

Example 5—Tridecamethylene carbonate

Fifty-one grams of tridecamethylene glycol was heated with 41.2 g. of butyl carbonate and 0.29 g. of sodium in the manner described in Example 1. The polymeric tridecamethylene carbonate thus obtained was a hard, waxy solid. Fifty-six and one-half grams of this solid was placed in a still of the type shown in Figure 1 and heated for three days at 220° C. under a pressure of 2 mm. Fifty-two grams of distillate collected. This was separated by filtration into 48 g. of liquid and 4.5 g. of crystalline solid. The latter was a mixture of tridecamethylene glycol and the cyclic dimer of tridecamethylene carbonate. The liquid monomer was distilled through a short column; it boiled at 151°–152° C. under 6 mm. pressure. One gram of crystalline residue remained. The liquid monomer had a powerful and exceedingly persistent musk-like odor.

Example 6—Tetradecamethylene carbonate

Twenty-nine and seven-tenths grams of tetradecamethylene glycol was heated with 25 g. of butyl carbonate and 0.11 g. of metallic sodium in the manner described in Example 1. The resulting polymeric tetradecamethylene carbonate was heated for six days at 240° C. under 2 mm. pressure in a still of the type shown in Figure 1. Twenty-one grams of distillate was received. This was distilled in a Claisen flask at 2 mm. The distillate boiling at 144°–146° C. consisted of 20 grams of a colorless liquid having a powerful musk-like odor. This was monomeric tetradecamethylene carbonate. The residue amounted to one gram. It consisted of a mixture of cyclic dimer and tetradecamethylene glycol.

Example 7—Carbonate of tetraethylene glycol

Thirty grams of tetraethylene glycol, 30 g. of butyl carbonate and 0.1 g. of sodium were heated together for three hours at 170° to 210° C. During this time 25 cc. of butyl alcohol collected in the chilled receiver. The residue was heated in vacuo for four hours at 190° to 200° C. The polymeric carbonate of tetraethylene glycol (32 g.) was thus obtained as sirupy residue which slowly solidified to a waxy solid. This was transferred to a still of the type shown in Figure 1 and heated at 220° C. for 18 hours. The distillate (25.7 g.) was purified by fractional distillation in vacuo. The pure monomeric cyclic tetraethylene glycol carbonate so obtained boiled at 128° to 130° C. at 1 mm., melted at 42° to 44° C., and had a faintly musky odor. This compound has the formula

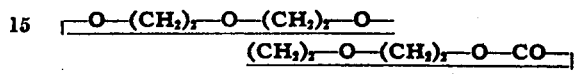

The properties of various cyclic carbonates prepared by the general method illustrated above are shown in Table 1.

The method illustrated in Examples 1, 2, and 3 may also be used for the preparation of cyclic esters derived from other dibasic acids than carbonic, and also from hydroxy acids. This is illustrated by the following examples.

Example 9—Ethylene nonamethylene dicarboxylate

One mole each of ethylene glycol and nonamethylene dicarboxylic acid

were heated together for two hours at 180° C. at ordinary pressure, and then for two hours at 220° C. at a pressure of 10 mm. The residual polymeric ethylene nonamethylene dicarboxylate was placed in a still of the type shown in Figure 2 and was heated in the manner described in Example 6. The distillate was separated into a monomeric ester melting at 35° C. and a dimeric ester melting at 143° C. The former had a faint, musk-like odor.

Example 10—Decamethylene oxalate

Four-tenths of a gram of sodium was dissolved in 60 g. of molten decamethylene glycol at 125°–140° C. in a Claisen flask. Fifty-two cubic centimenters of ethyl oxalate was then added and the mixture heated from 130° to 170° C. during two hours. During the last half hour a current of carbon dioxide was passed through the melt.

TABLE I.—Cyclic carbonates

| Carbonate | No. of atoms in monomeric ring | M. P. of monomer, °C. | B. P. of monomer, °C. | M. P. of dimer, °C. | Odor of monomer |
|---|---|---|---|---|---|
| Hexamethylene | 9 | Liquid | | 128–129 | Strong, cedary, camphoraceous. |
| Heptamethylene | 10 | | | 97– 98 | Spicy, aromatic. |
| Octamethylene | 11 | Liquid | 74–76 at 0.5 mm | 115–116 | Camphoraceous, earthy. |
| Nonamethylene | 12 | 34–35 | 63–64 at 0.1 mm | 95– 96.5 | Minty, earthy. |
| Decamethylene | 13 | Liquid | 88–89 at 1 mm | 105–106 | Rose-like. |
| Undecamethylene | 14 | 40–41 | 104.5 at 7 mm | 97– 97.5 | Fatty, cedary. |
| Dodecamethylene | 15 | 11–12 | 118–119 at 3 mm | 93– 95 | Musk-like, weak. |
| Tridecamethylene | 16 | 23–24.5 | 149–150 at 4.5 mm | | Musk-like. |
| Tetradecamethylene | 17 | 21–22 | 144–146 at 2 mm | | Musk-like, strong. |
| Octadecamethylene | 21 | 36–37 | 165–169 at 1 mm | | Faint, fragrant. |
| Tetraethylene glycol | 14 | 42–44 | 128–130 at 1 mm | | Faint, musky. |

Example 8—Ethylene sebacate

A sample of polymeric ethylene sebacate (prepared for example by heating a mixture of sebacic acid and ethylene glycol at a temperature of 175°–200° C. for four hours) was placed in a vessel with a condensing surface cooled by a current of water arranged close to the surface of the ester (ca. 3 cm.) (Figure 2). The vessel was evacuated to a pressure below 0.1 mm. and heated by a bath at 250°–300° C. during three days. In this interval material collected on the condensing surface. This was separated by vacuum sublimation into two fractions, one having a melting point of 80°–81° C. and the other a melting point of 40°–41° C. Analysis and molecular weight determination showed the higher melting compound to be cyclic dimeric ethylene sebacate, a 28-membered ring (I). It was purified by crystallization from alcohol. The low melting compound had the same composition as the higher melting compound and possessed a faint musk-like fragrance also characteristic of the crude distillate. It was the monomeric 14-membered ring (II).

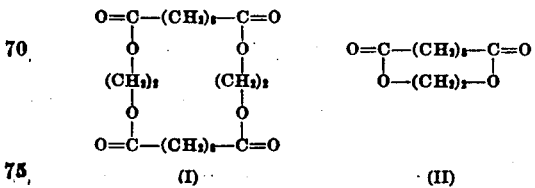

Thirty-six cubic centimeters of ethyl alcohol distilled. The residue was then heated further two hours at 130° to 170° C. at 1 mm. pressure. The residual polymeric decamethylene oxalate was a hard, waxy solid. Two 30-gram batches of this material were separately heated for four days each in a still of the type illustrated in Figure 1. Forty-seven grams of distallate consisting of crystalline material suspended in liquid was collected and filtered. Two grams of crystalline material was thus obtained which examination showed to be decamethylene glycol. The liquid filtrate was distilled through a short column and yielded 40 g. of pure monomeric cyclic decamethylene oxalate which distilled at 124°–126° C. under 0.2 mm. pressure (bath temperature 175° C.). The compound has a characteristic musk-like fragrance.

Example 11—Undecamethylene oxalate

About 0.05 g. of sodium was dissolved in 6.5 g. of molten undecamethylene glycol in a small Claisen flask. Five and six-tenths grams of ethyl oxalate was then added and the mixture heated to 175° C. during 1.5 hours. Carbon dioxide was passed through the mixture for the last half hour. The residue was then heated for 2.5 hours under 1 mm. pressure at 175° C. The residue of polymeric undecamethylene oxalate, an opaque brittle solid, was transferred to a still of the type illustrated in Figure 2 fitted with a small glass receptacle fixed to the condenser in such a way as to catch any liquid dripping from its lower end, and heated at 210°–225° C. for 18 hours. Five and two-tenths grams of liquid distillate was obtained. It distilled at 120°–123° C. under 0.5 mm. (bath at 150°–154° C.). The monomeric cyclic undecamethylene oxalate so obtained had a melting point of 23°–24.5° C. and a powerful musk-like odor.

*Example 12—Decamethylene malonate*

Two-tenths of a gram of sodium was dissolved in 35.5 g. of molten decamethylene glycol in a distilling flask, 35.5 g. of diethyl malonate was added, and the mixture was heated by a bath at 180° C. during three hours. A stream of carbon dioxide was passed through the mixture during the last part of the heating period. The ethyl alcohol which distilled and collected in the receiver amounted to 22.5 cc. The residue was then heated further for two hours in vacuo at 175° C. The residual decamethylene malonate, a thick, slightly colored sirup, was transferred to a still of the type shown in Figure 1 and heated in vacuo for five days at about 190° C. The distillate which collected during this period was separated by filtration into a liquid and a crystalline portion. The latter (3.5 g.) was decamethylene glycol. The liquid portion (28.5 g.) was redistilled and the purified material, which boiled at 117°–118° C. at 0.5 mm., was identified as monomeric cyclic decamethylene malonate. It is a colorless liquid and has a pleasant odor resembling that of musk.

The properties of some other esters prepared by the general method illustrated in the preceding examples are shown in Table II.

TABLE II

| Ester | Number of atoms in ring of dimer | M. P. of dimer |
|---|---|---|
| Ethylene decamethylene dicarboxylate | 32 | 95–96° C. |
| Ethylene brassylate | 34 | 145–146° C. |
| Ethylene dodecamethylene dicarboxylate | 36 | 102–103° C. |
| Trimethylene sebacate | 30 | 108–110° C. |
| Decamethylene succinate | 32 | 108–109° C. |
| Dimeric lactone from ω-hydroxy pentadecanoic acid | 32 | 83–84° C. |

As the above examples illustrate, the depolymerization of linear polyesters generally leads to a mixture of the corresponding cyclic monomer and cyclic dimer. Under any given set of conditions the ratio of these two products depends upon the nature of the ester, and in certain cases one of these products predominates almost to the exclusion of the other. This ratio can, however, in many cases be greatly modified by adjusting the conditions under which the depolymerization is carried out. Thus, in the depolymerization of polymeric carbonates such as octamethylene, nonamethylene, and decamethylene carbonates, the dimer predominates if the conditions permit practically instantaneous and complete distillation of the products as they are formed; but this ratio is completely reversed if the conditions permit refluxing during distillation. This is illustrated especially in Examples 1–4.

It is evident that the precedure described above provides a general method for the synthesis of cyclic carbonates of the general formulas:

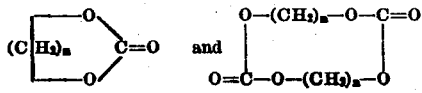

in which $n$ is greater than 3. The method is equally applicable to compounds of these types in which the polymethylene chain bears one or more substituent groups, such as methyl groups. Also one or more methylene groups may be replaced by oxygen.

The method of this invention, so far as the cyclic carbonates are concerned, consists in depolymerizing in the manner described, linear polycarbonates of the general formula

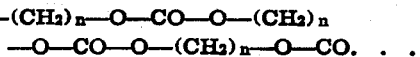

The preparation of such polycarbonates forms no part of the present invention. So far as the purposes of the present invention are concerned, the polycarbonates may be prepared by any convenient method, e. g., by the action of an alkyl or aryl ester of carbonic acid on the glycol; by the action of phosgene on the glycol (preferably in the presence of a base such as pyridine); or by the action of a salt of carbonic acid on an alkylene halide.

Polyesters derived from a given glycol and a given dibasic acid vary considerably in molecular weight (length of the molecule) and in the nature of the terminal groups, depending upon the method and particular conditions used in their preparation, but these variations do not in any way affect the applicability of the present invention.

The procdure of this invention also provides a general method for the preparation of cyclic esters from glycols and dibasic acids other than carbonic:

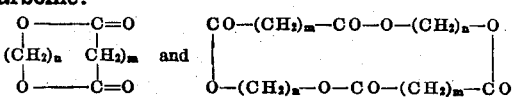

In the above formulas $m$ is 0, 1, 2, 3 or greater, $n$ is greater than 1 and $m+n$ is greater than 2. The acids thus included are oxalic, malonic, succinic, glutaric, adipic, pimelic, suberic, azelaic, sebacic, and higher acids of the same series. The method is especially applicable to the preparation of oxalates and malonates of the above formulas. Moreover, the polymethylene groups $(CH_2)_n$ and $(CH_2)_m$ may be substituted by substituent groups, such as methyl. The method consists in depolymerizing the corresponding polyesters in the manner already described. The requisite polyesters may be prepared by any convenient method, e. g., by heating together the dibasic acid or acid chloride and the glycol; by heating together an alkyl or an aryl ester of the dibasic acid and the glycol; by the action of a metal salt of the acid on an alkylene halide, etc.

The method of this invention may also be applied to the synthesis of cyclic esters derived from hydroxy acids of the formula $HO(CH_2)_nCOOH$, in which $n$ is greater than 5. In this case also the $(CH_2)_n$ group may have substituent groups and the method consists in depolymerizing in the manner described, polyesters derived from the hydroxy acids and prepared in any convenient manner.

Both the monomeric and the dimeric cyclic esters of the types with which this invention is concerned can be polymerized by the action of heat (e. g., at a temperature of 150° to 250° C.). The polymerization is accelerated by the presence of basic catalysts such as alkali hydroxides, carbonates, and alcoholates. The products thus obtained are linear polyesters and they can be depolymerized by the method of this invention.

They are thus reconverted to the cyclic monomer and dimer. This fact is useful, since in certain cases where both the monomer and the dimer are produced, it may be that only the monomer is sought. The dimer can then be polymerized and returned to the process to be used as further source of monomer.

The characteristic fragrances of the monomeric cyclic esters make them useful either alone or in combination with other substances in the compounding of perfumes, toilet waters, cosmetics, soaps, incense and the like. The close resemblance of the odors of monomeric dodecamethylene, tridecamethylene, tetradecamethylene carbonates, and of decamethylene and tridecamethylene oxalates to that of natural musk and their fixative power makes them valuable as substitutes for this material. Monomeric decamethylene carbonate has an odor resembling otto of roses.

The above description and examples are intended to be illustrative only. Any modification of or variation therefrom which conforms to the spirit of the invention is intended to be included within the scope of the claims.

We claim:

1. The process of forming cyclic esters having rings of more than seven atoms which comprises depolymerizing the corresponding linear polyester.

2. The process of forming a cyclic ester of a dihydric alcohol and an aliphatic dibasic, carboxylic acid, said ester having more than seven atoms in the ring, which comprises depolymerizing the corresponding linear polyester.

3. The process of forming cyclic monomeric esters having rings or more than seven atoms which comprises depolymerizing the corresponding linear polyester.

4. The process of forming cyclic dimeric esters having a unit length greater than eight which comprises depolymerizing the corresponding linear polyester.

5. The process of claim 1 in which the ester is depolymerized by heating at a temperature within the range of 150° C. up to that temperature at which substantial thermal decomposition will take place.

6. The process of claim 1 in which the ester is depolymerized by heating a body of said ester, the surface of which is great compared with the volume, at a temperature of 150 C. up to that temperature at which substantial thermal decomposition will take place.

7. The process of claim 1 in which the ester is depolymerized by heating under a vacuum at a temperature within the range of 150° C. up to that temperature at which substantial thermal decomposition will take place.

8. The process of claim 1 in which the ester is depolymerized by heating at a temperature within the range of 150° C. up to that temperature at which substantial thermal decomposition will take place at a pressure below 30 mm. of mercury (absolute).

9. The process of claim 1 in which the ester is depolymerized by heating at a temperature within the range of 150° C. up to that temperature at which substantial thermal decomposition will take place in the presence of a depolymerization catalyst.

10. The process of claim 1 in which the ester is depolymerized by heating at a temperature within the range of 150° C. up to that temperature at which substantial thermal decomposition will take place in the presence of a depolymerization catalyst taken from the class consisting of alkali metals, their hydroxides, carbonates and alcoholates.

11. The process of claim 1 in which the ester is depolymerized by heating at a temperature within the scope of 150° C. up to that temperature at which substantial thermal decomposition will take place under a pressure less than 30 mm. of mercury (absolute), and continuously distilling the product as it is formed, into a cooled receiver.

12. The process of claim 1 in which the ester is depolymerized by heating at a temperature within the range of 150° C. up to that temperature at which substantial thermal decomposition will take place under a pressure less than 30 mm. of mercury (absolute), and condensing the formed cyclic esters on a cooled surface which is close to the surface of the body of the polyester under treatment.

13. The process of claim 1 in which the ester is depolymerized by subjecting a body of said ester, the surface of which is great compared with its volume, to a temperature within the range of 150° C. up to that temperature at which substantial thermal decomposition will take place and to a pressure less than 30 mm. of mercury (absolute), and condensing the formed cyclic ester.

14. The process of claim 3 in which the ester is depolymerized by subjecting a body of said ester, the surface of which is great compared with its volume, to a temperature within the range of 150° C. up to that temperature at which substantial thermal decomposition will take place and to a pressure less than 30 mm. of mercury (absolute).

15. A compound selected from the class consisting of cyclic monomeric and dimeric esters of a dihydric alcohol and an aliphatic, dibasic, carboxylic acid, said esters having a unit length greater than eight.

16. A cyclic ester of unit length greater than 8, said ester having a general formula chosen from the class consisting of

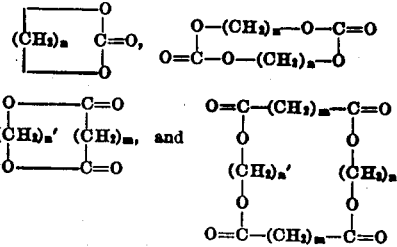

where $n$ is greater than five, $n'$ greater than one, $m$ is zero or a positive number, and $m+n'$ is greater than four.

17. A cyclic monomeric carbonate having more than eight atoms in the ring.

18. A cyclic monomeric carbonate having the general formula

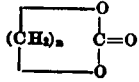

where $n$ is greater than five.

19. A cyclic monomeric carbonate having the general formula

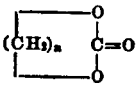

where $n$ is nine to fifteen inclusive.

20. Monomeric decamethylene carbonate.
21. Monomeric tridecamethylene carbonate.
22. Monomeric tetradecamethylene carbonate.
23. A perfume composition containing as its odor-imparting ingredient a monomeric cyclic ester of a glycol and an aliphatic dibasic carboxylic acid, said ester having more than eight atoms in the ring.
24. A perfume composition containing as its odor-imparting ingredient a monomeric cyclic ester of a glycol and an aliphatic dibasic carboxylic acid, said ester having twelve to eighteen atoms, inclusive, in the ring.
25. A perfume composition containing as its odor-imparting ingredient a monomeric carbonate of the general formula

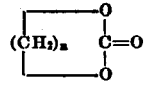

where $n$ is nine to fifteen inclusive.

26. A perfume composition containing as its odor-imparting ingredient monomeric decamethylene carbonate.
27. A perfume composition containing as its odor-imparting ingredient monomeric tridecamethylene carbonate.
28. A perfume composition containing as its odor-imparting ingredient monomeric tetradecamethylene carbonate.

WALLACE H. CAROTHERS.
JULIAN W. HILL.